June 21, 1927.

S. HANSON

DISPENSING MACHINE

Filed June 27, 1924

1,633,207

3 Sheets-Sheet 1

INVENTOR.
SIGVORT HANSON,
BY James A. Walsh
ATTORNEY.

June 21, 1927.
S. HANSON
DISPENSING MACHINE
Filed June 27, 1924
1,633,207
3 Sheets-Sheet 2
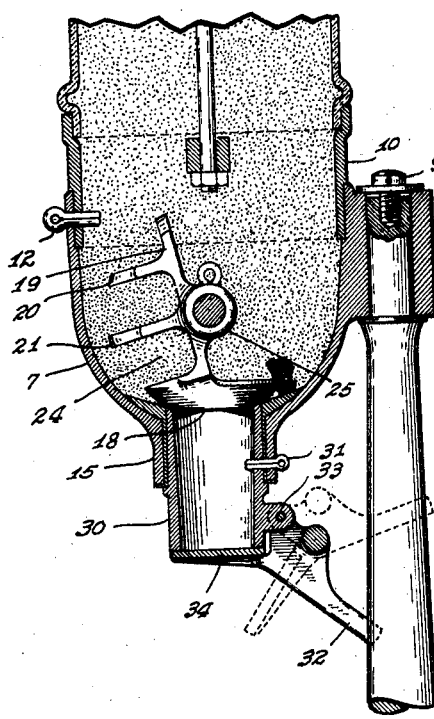
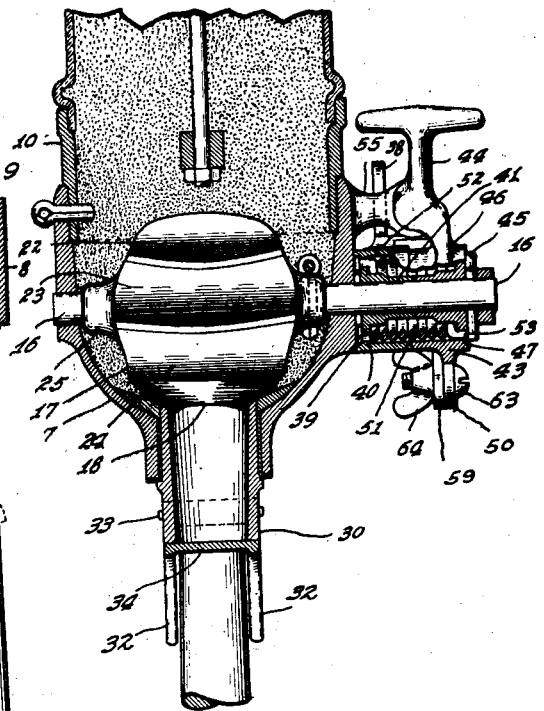
INVENTOR.
SIGVORT HANSON,
BY James A. Walsh.
ATTORNEY.

June 21, 1927.

S. HANSON 1,633,207

DISPENSING MACHINE

Filed June 27, 1924

3 Sheets-Sheet 3

INVENTOR.
SIGVORT HANSON,

BY James A Walsh.

ATTORNEY.

Patented June 21, 1927.

1,633,207

UNITED STATES PATENT OFFICE.

SIGVORT HANSON, OF RACINE, WISCONSIN.

DISPENSING MACHINE.

Application filed June 27, 1924. Serial No. 722,862.

My invention relates to machines for dispensing material in measured quantities, such as malted milk powder, the object being to provide a machine of this character of simple construction which can be readily adjusted for apportioning the charge to be delivered, and which can be quickly disassembled for cleansing or otherwise as will be hereinafter more particularly pointed out.

Figure 1:
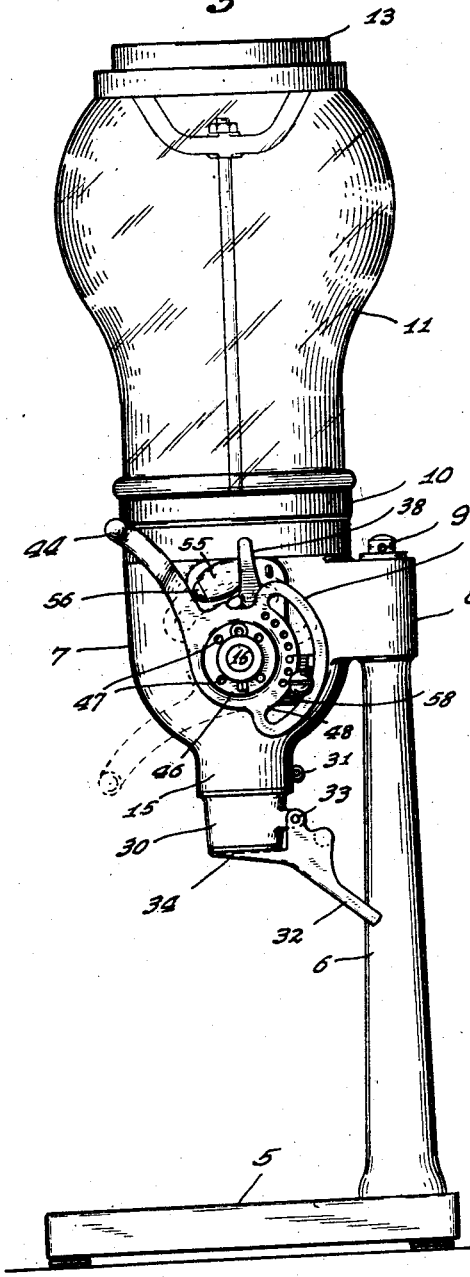
Figure 2:
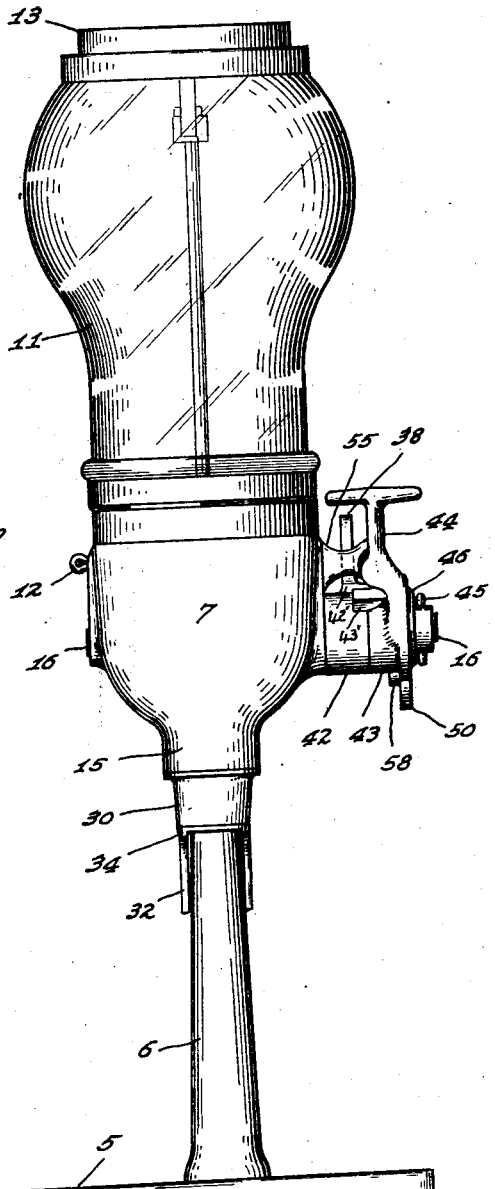

In the accompanying drawings forming part hereof, Figure 1 is a side elevation, and Fig. 2 a front elevation, of a dispenser embodying my improvements; Figs. 3 and 4 detail views in elevation of the material containing chamber and discharger; Fig. 5 a plan of said chamber and discharger with the upper container removed; Fig. 6 a fragmentary detail of the actuating lever mechanism which I employ; Fig. 7 a perspective of an adjustable controller for said lever mechanism; Fig. 8 a detail of a tension lever associated with said actuating lever mechanism, and Figs. 9, 10 and 11, detail vertical sectional views showing the discharger in first, second and third positions respectively, and Fig. 12 is a perspective of said discharger.

I provide a base, 5, and standard, 6, of any appropriate character for supporting the container, which latter comprises a bowl, 7, secured to standard 6 by an arm, 8, by means of a set-screw, 9, or as may be desired. The upper portion of said bowl is of a character to receive a collar, 10, secured to the mouth of a glass or other container, 11, said collar being connected to the bowl by pins, 12, or otherwise, so that the container as a whole may be readily removed from said bowl, the upper portion of the container having a cover, 13, for removal when depositing a quantity of material therein. As said container 11 forms no part of my present invention the same will only be referred to incidentally in the description thereof.

As will be observed by reference to Figs. 3, 4 and 5, the bowl 7 is of a simple character, and at its lower or discharge end preferably terminates in tubular formation, at 15. In said bowl I mount a rock-shaft, 16, one end of which extends outwardly from the bowl for a purpose which will appear. On said rock-shaft 16, I mount a combined agitator, measure and discharger, 17, Fig. 12, for the material to be dispensed, and which will be hereinafter referred to as the discharger. Said discharger comprises a closure, 18, designed to cover the discharge outlet of the bowl 7, and a graduated measure having the substantially vertical or main wall, 19, and the horizontal walls, 20, 21, said walls 20, 21, and the closure 18 constituting compartments, 22, 23, 24, of varying capacities. All of said elements, that is, the closure, 18, walls 19, 20 and 21, and collar, 25, for securing the same on rock-shaft 16, are preferably of an integral structure, so that the assemblage of the dispenser is rendered extremely simple as but a single element is required for the purpose stated but which is capable of functioning in a manner to perform different operations on the material to be dispensed. As will be noted, in Fig. 5, said discharger 17, when mounted on rock-shaft 16, may be secured in fixed position in relation thereto by a cotter-pin, 27, which permits its ready mounting on and removal from said shaft 16.

While I have shown a discharge outlet 15 of tubular formation which may be suitable for dispensing certain materials, it is of importance in handling malted milk powder to provide means for excluding atmosphere and extraneous matter and for which purpose I employ a supplemental tube, 30, adapted to be secured to discharge outlet 15 by a pin, 31, or otherwise. At the lower end of said tube 30 I mount a pair of arms, 32, by means of a hinge, 33, said arms terminating in a cover 34, which normally closes the lower end of said tube 30 as shown in Fig. 1, but when it is desired to discharge material into a glass or other vessel it is but necessary to push the same against arms 32, which action throws them into approximately the position shown by dotted lines in Fig. 3, when said cover 34 will be removed and the material discharged into the glass, and, as will be understood, when the latter is removed said cover by gravity will return to its normal closing position. While I have shown the supplemental tube 30 it will be understood that tube 15 may be directly equipped with the device comprising the arms 32 and cover 34 and the same result obtained; but I prefer to provide a supplemental detachable tube in said outlet 15, upon which the movable closure 18 will become snugly seated, for the reason that in dispensing products of a sticky nature which have a tendency to adhere to the discharge outlet I am enabled to readily remove and replace said tube from time to time for cleansing purposes.

Upon the outer end of rock-shaft 16 I secure my improved mechanism for actuating the discharger 17, which comprises a tension lever, 38, having a disc, 39, provided with perforations, 40, said disc having a hub, 41, for mounting the same on shaft 16, and a collar, 42, which meets with a collar, 43, forming part of actuating lever, 44, also mounted on shaft 16 and secured thereto by a pin, 45, said actuating lever comprising in part a hub, 46, having perforations, 47, therein, a disc, 48, having perforations, 49, therein, and a lever strap, 50. Surrounding shaft 16 is a coiled spring, 51, one end, 52, of which is secured in a perforation 40 in disc 39, and the opposite end, 53, being secured in a perforation 47 of hub 46, by which arrangement the tension of said spring 51 may be adjusted as desired by inserting its ends into the perforations which it may be determined will impart the required degree of tension. Said collars 42 and 43 are provided respectively with stops, 42′, and, 43′, which abut against each other through the tension of spring 51, so that when the structure comprising levers 44 and 38 and parts associated therewith are removed from shaft 16 said stops 42′ and 43′ retain the spring in its adjusted position. Said lever 38 and actuating lever 44 are urged toward each other by tension of the spring 51, and therefore, as shown in Fig. 2, I position said levers on opposite sides of an arm, 55, projecting from bowl 7 so that movement of the levers will be thus limited. As lever 44 is in frequent use I provide a bumper or cushion, 56, on said arm 55 so that when said lever returns to normal position its movement will be stopped without severe shock. As a means for increasing or decreasing the charge to be delivered from the dispenser I provide the lever strap 50 with an adjustable controller, 58, substantially as shown in Fig. 7, comprising a pointed member, 59, embodying a lug, 60, designed to travel in slot, 61, of lever strap 50, and a boss, 62, adapted to register with the perforations 49, by which means said controller may be adjusted in different positions in relation to said strap and held in predetermined positions by a screw bolt, 63, which passes through said slot and controller and is secured by a nut, as 64. When said controller is positioned, upon actuating lever 44, its upper face abuts against arm 55 and limits the rocking movement of shaft 16.

Figure 9:
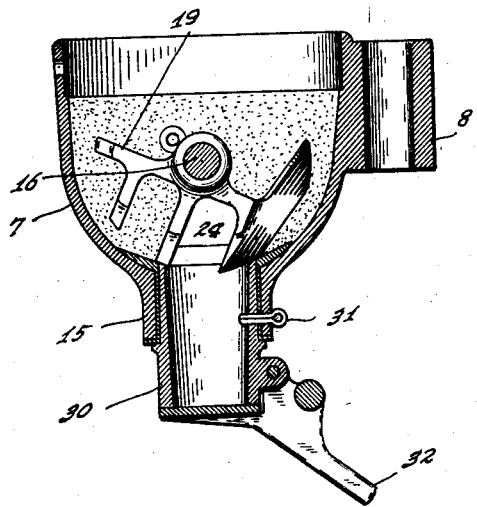
Figure 10:
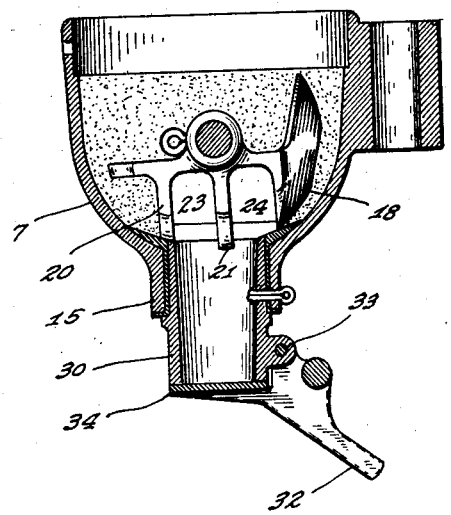
Figure 11:
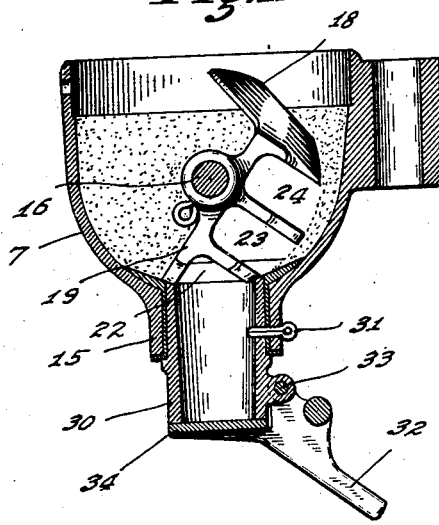
Figure 12:
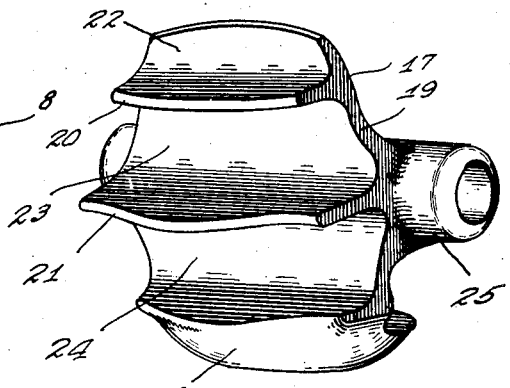

Upon reference to Figs. 9, 10 and 11 it will be seen that I have indicated three positions of adjustment of said discharger 17 which when placed in first position presents compartment 24 to the outlet of bowl 7, thus discharging the quantity of material which has filled said compartment; if an increased charge is desired then the controller 58 is adjusted to second position when compartments 24 and 23 by rotation of rock-shaft 16 are carried around over said outlet and the contents of both are discharged; and when a still further increase in the charge is desired the controller is adjusted to third position which permits compartments 24, 23 and 22 to pass across said outlet and the contents of said three compartments thus discharged, the operation in each instance being accomplished by manipulating actuating lever 44.

It will therefore be seen that in operating my improved dispenser it is but necessary to deposit material into the bowl thereof and pull lever 44 forward, which action causes closure 18 to be removed from the bowl outlet, and one, two or three of the material receiving compartments, according to adjustment of the discharger 17, to pass across the outlet to discharge such material. The simple device 17 as explained thus acts as a closure for retaining material in the bowl until it is desired to discharge the same, and because of its peculiar construction involving walls and compartments the irregular formation of said discharger acts as an agitator for loosening the material and causing it to fall into said compartments to be discharged in the measured quantity desired, as, for example, one-fourth ounce, one-half ounce, or three-fourths ounce, or other proportions, according to the predetermined capacities of said compartments and their adjustments, the walls 21 and 20 also acting as scrapers for gathering material in their movements.

By reference to the drawings it will be seen that my improved discharger and actuating mechanism may be quickly removed from the machine by withdrawing the pins 27, 45, and the machine may be also readily assembled, as there are no screws, bolts or the like required for connecting and securing the parts together, which is of considerable advantage in manufacturing and for commercial purposes, as will be understood.

I claim as my invention:

1. In a dispensing machine embodying a material containing chamber having an outlet, a discharger in said chamber embodying a wall, a compartment positioned laterally in relation to said wall, and a closure adjacent said compartment for closing and opening said outlet; a shaft upon which said discharger is mounted; means on said shaft for actuating the same; and means for adjusting said shaft to vary the movement of said discharger to increase or decrease the delivery of material from said chamber through its outlet.

2. In a dispensing machine embodying a chamber having an outlet, a discharger in said chamber embodying walls constituting a compartment and a closure; a shaft upon which said discharger is mounted, the latter having its compartment disposed in lateral relation to said shaft; means for adjusting said shaft to vary the movement of said discharger; and a yieldingly controlled lever for actuating said shaft to position said discharger for delivering material from said chamber through its outlet.

3. In a dispensing machine embodying a material containing chamber having an outlet, a discharger in said chamber comprising a plurality of measures for apportioning material in varying quantities and discharging the same from said chamber through its outlet, and means associated with said discharger for actuating the same.

4. In a dispensing machine embodying a material containing chamber having an outlet, a discharger embodying a main wall, walls extending substantially at right angles therefrom, a shaft upon which said discharger is mounted, and means for operating said shaft to cause said walls to agitate, scrape and convey material from said dispenser.

5. In a dispensing machine having an outlet, a discharger comprising a plurality of material receiving compartments adapted to discharge material through said outlet, means for supporting said discharger, and means for adjusting said supporting means so that one or more of said compartments will register with and discharge material through said outlet.

6. A dispensing machine having a material containing chamber embodying an outlet, a supplemental tubular member in said outlet, a rocking discharger in said chamber comprising a closure and a measure, and means for actuating said discharger to convey material into said tubular member.

7. The combination, with a dispensing machine, of a shaft, a lever connected thereto, a discharger mounted on said shaft, and an adjustable controller associated with said lever for regulating the rocking of said shaft to increase or decrease the movement of said discharger to convey varying charges of material from said dispenser.

8. In a dispensing machine, a material containing receptacle, a shaft mounted therein, a discharger mounted on said shaft comprising a closure and a plurality of compartments, a lever for rocking said shaft and actuating said discharger, and means associated with said lever for regulating the action of said shaft to vary the movement of said discharger to convey increased or decreased charges of material from said dispenser.

9. In a dispensing machine, a material receiving receptacle having an arm extending therefrom, a shaft mounted in said receptacle, a lever having a perforated disc mounted on said shaft, said lever abutting against said arm, an actuating lever having a perforated hub mounted on said shaft and abutting against said arm, and a spring coiled about said shaft and connected at one end to said disc and at its opposite end to said hub for controlling the movement of said actuating lever.

10. In a dispenser, a material receiving chamber, a discharger therein, a shaft supporting said discharger, a lever for actuating said shaft and discharger, a lever-strap connected to said lever, a controller connected to said lever-strap, and means for adjusting said controller in relation to said strap.

11. In a dispenser, a material receiving chamber, a discharger therein, a rock-shaft supporting said discharger, a spring about said shaft, a collar enclosing said shaft and spring, means within said collar to which the opposite ends of said spring are attached, and a lever secured to said rock-shaft for rotating the same and thereby actuating said discharger to convey material from said chamber.

12. A dispensing machine having a material containing chamber embodying an outlet, a removable tubular member in said outlet, a discharger in said chamber for delivering material therefrom through said member, a shaft upon which said discharger is mounted, and means for operating said shaft to actuate said discharger to deliver material from said chamber through said tubular member.

13. The combination, in a dispensing machine, of a base, a material receiving chamber supported thereby, a material containing receptacle connected to said chamber for delivering material thereinto, said chamber having an outlet, a discharger in said chamber in the path of the material delivered from said receptacle comprising a combined measuring compartment and a closure for said outlet, a shaft upon which said discharger is mounted, a lever connected to said shaft for actuating the same and said discharger, a spring associated with said lever and said shaft for controlling the latter, and a removable tubular member arranged in the path of said discharger through which material is delivered therefrom.

14. In a dispensing machine embodying a material containing chamber having an outlet, a shaft extending through said chamber, a discharger mounted upon said shaft, means for adjusting said shaft to vary the throw of said discharger to increase or decrease the delivery of material from said chamber through its outlet, and a lever for operating said shaft to actuate said discharger for delivering material from said chamber.

15. In a dispensing machine embodying a material containing chamber having an outlet, a discharger in said chamber comprising a closure for controlling the flow of material and a plurality of measures for apportioning such material and discharging the same through the outlet of said chamber, and means for actuating said discharger.

In testimony whereof I affix my signature.

SIGVORT HANSON.